United States Patent
Gao et al.

(10) Patent No.: US 12,360,707 B2
(45) Date of Patent: Jul. 15, 2025

(54) METHOD, ELECTRONIC DEVICE, AND COMPUTER PROGRAM PRODUCT FOR DATA STORAGE

(71) Applicant: Dell Products L.P., Round Rock, TX (US)

(72) Inventors: Hongpo Gao, Beijing (CN); Jamin Kang, Beijing (CN); Jian Gao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/221,564

(22) Filed: Jul. 13, 2023

(65) Prior Publication Data

US 2024/0231705 A1 Jul. 11, 2024

(30) Foreign Application Priority Data

Jan. 6, 2023 (CN) .......................... 202310020758.0

(51) Int. Cl.
*G06F 3/06* (2006.01)
(52) U.S. Cl.
CPC .......... *G06F 3/0665* (2013.01); *G06F 3/0689* (2013.01); *G06F 3/0604* (2013.01)
(58) Field of Classification Search
CPC ..... G06F 3/0665; G06F 3/0689; G06F 3/0604
See application file for complete search history.

(56) References Cited

U.S. PATENT DOCUMENTS

| | | |
|---|---|---|
| 11,061,770 B1 | 7/2021 | Patel et al. |
| 11,099,940 B1 | 8/2021 | Patel et al. |
| 11,232,043 B2 | 1/2022 | Patel et al. |
| 11,256,678 B2 | 2/2022 | Patel et al. |
| 11,314,580 B2 | 4/2022 | Chawla et al. |
| 11,334,523 B2 | 5/2022 | Mathews et al. |
| 11,625,169 B2 | 4/2023 | Chen et al. |
| 2012/0082017 A1* | 4/2012 | Inagaki ............... G11B 20/1883 369/30.01 |
| 2014/0089580 A1* | 3/2014 | Yochai ................ G06F 11/1092 711/114 |
| 2021/0373796 A1* | 12/2021 | Matosevich .......... G06F 3/0689 |
| 2022/0300181 A1* | 9/2022 | Han ..................... G06F 3/0644 |

* cited by examiner

*Primary Examiner* — Masud K Khan
(74) *Attorney, Agent, or Firm* — BainwoodHuang (57) ABSTRACT

A data storage technique involves determining one or more storage allocation units from a virtual storage region corresponding to a disk set including a plurality of disks. The technique further involves allocating a virtual storage unit to the one or more storage allocation units. The technique further involves storing a mapping relationship of the virtual storage unit with respect to the virtual storage region and the one or more storage allocation units. Accordingly, the granularity of each virtual storage unit can be reduced, so that storage resources can be invoked more accurately, and the storage space can be saved.

20 Claims, 6 Drawing Sheets

METHOD, ELECTRONIC DEVICE, AND COMPUTER PROGRAM PRODUCT FOR DATA STORAGE

CROSS-REFERENCE TO RELATED APPLICATION

This application claims priority to Chinese Patent Application No. CN202310020758.0, on file at the China National Intellectual Property Administration (CNIPA), having a filing date of Jan. 6, 2023, and having "METHOD, ELECTRONIC DEVICE AND COMPUTER PROGRAM PRODUCT FOR DATA STORAGE" as a title, the contents and teachings of which are herein incorporated by reference in their entirety.

TECHNICAL FIELD

Embodiments of the present disclosure relate to the field of computers, and more particularly, to a method, an electronic device, and a computer program product for data storage.

BACKGROUND

A disk array, such as a redundant array of independent disks (RAID), is a disk group composed of a plurality of independent disks combined in a certain way. From a user's perspective, the redundant array of independent disks is like a disk, which, however, can provide a higher storage capacity than a single hard disk, and can also provide data backup. When data in a disk area is damaged, the data backup may also be used to recover the damaged data, thereby protecting the safety of user data. A virtual storage unit has a structure and functions similar to those of RAID. Each virtual storage unit corresponds to multiple disk slices on different storage disks. However, a current storage region allocation mechanism of the virtual storage unit is not flexible, and there may be a waste of storage resources.

SUMMARY OF THE INVENTION

Embodiments of the present disclosure provide a method, an electronic device, and a computer program product for data storage.

According to a first aspect of the present disclosure, a data storage method is provided. The method includes determining one or more storage allocation units from a virtual storage region corresponding to a disk set including a plurality of disks. The method further includes allocating a virtual storage unit to the one or more storage allocation units. In addition, the method further includes storing a mapping relationship of the virtual storage unit with respect to the virtual storage region and the one or more storage allocation units.

According to a second aspect of the present disclosure, an electronic device is provided. The electronic device includes: a processor; and a memory, storing computer program instructions, wherein the processor executes the computer program instructions in the memory to control the electronic device to perform actions including: determining one or more storage allocation units from a virtual storage region corresponding to a disk set including a plurality of disks; allocating a virtual storage unit to the one or more storage allocation units; and storing a mapping relationship of the virtual storage unit with respect to the virtual storage region and the one or more storage allocation units.

According to a third aspect of the present disclosure, a computer program product is provided. The computer program product is tangibly stored on a non-volatile computer-readable medium and includes machine-executable instructions, wherein the machine-executable instructions, when executed, cause a machine to perform actions including: determining one or more storage allocation units from a virtual storage region corresponding to a disk set including a plurality of disks; allocating a virtual storage unit to the one or more storage allocation units; and storing a mapping relationship of the virtual storage unit with respect to the virtual storage region and the one or more storage allocation units.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

In a RAID-based storage system, one virtual storage unit can be mapped to disk slices from a plurality of storage disks via one virtual storage region. In the process of RAID-based data recovery, other disk slices in the same virtual storage unit can be used to recover data of a target disk slice. It should be noted that the size of a virtual storage region is generally limited by factors such as the size of an actual disk slice, a RAID type, and a RAID width. Therefore, the granularity of the virtual storage unit is usually large, for example, several GBs. When the size of data that is read or written is several MBs, it will cause a waste of a storage space. For a better understanding of a data storage process according to the embodiments of the present disclosure, a basic architecture of the RAID-based storage system will be first introduced below.

Figure 1:
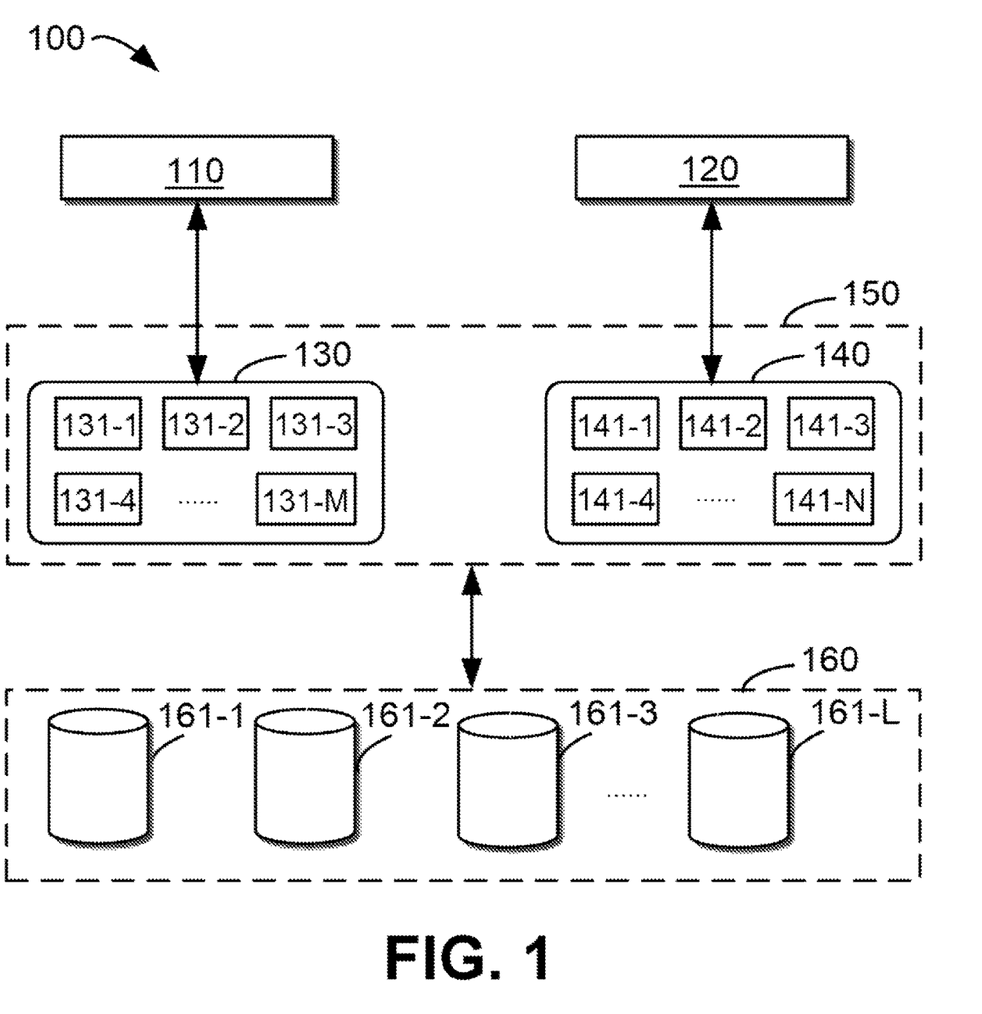
FIG. 1 shows a schematic diagram of an example storage system in which the embodiments of the present disclosure may be implemented.

FIG. 1 shows a schematic diagram of example storage system 100 in which the embodiments of the present disclosure may be implemented. As shown in FIG. 1, storage system 100 includes hardware storage pool 160 which includes a plurality of storage disks 161-1, 161-2, 161-3, . . . , 161-L (L is an integer greater than or equal to 1), etc. for providing a physical storage space of storage system 100. For ease of discussion, these storage disks are sometimes referred to collectively or respectively as storage disk 161. Storage disk 161 may include various types of devices having a storage function, including but not limited to a hard disk drive (HDD), a solid state disk (SSD), a removable disk, a compact disc (CD), a laser disk, an optical disk, a digital versatile disc (DVD), a floppy disk, a Blu-ray disc, a serial-attached small computer system interface (SCSI) storage disk (SAS), a serial advanced technology attachment (SATA) storage disk, any other magnetic storage devices and any other optical storage devices, or any combination thereof.

A RAID system in storage system 100 is established on hardware storage pool 160 to organize physical storage spaces of multiple storage disks 161 by using a RAID algorithm. Specifically, as shown in FIG. 1, virtual storage region 130 and virtual storage region 140 are located in virtual storage region layer 150 in the RAID system. It should be understood that virtual storage region layer 150 can also contain more virtual storage regions. Virtual storage region 130 may correspond to multiple physical storage units 131-1, 131-2, 131-3, 131-4, . . . , 131-M (M is an integer greater than or equal to 1). Correspondingly, virtual storage region 140 may correspond to multiple physical storage units 141-1, 141-2, 141-3, 141-4, . . . , 141-M (M is an integer greater than or equal to 1). Virtual storage units 110 and 120 or more are also constructed on virtual storage region layer 150. It should be understood that virtual storage units 110 and 120 have the same RAID type and RAID width, and expose a logical space to users, so that the physical storage space of multiple storage disks 161 in hardware storage pool 160 can be used.

In addition, the RAID system provides a flat physical address space to a mapper in storage system 100. The mapper is configured to manage mapping between a physical address and a logical address of storage system 100. The mapper provides a flat linear logical address space to a namespace module. The namespace module utilizes the logical address space provided by the mapper and may call an application program interface (API) of the mapper to obtain the mapping from the logical address to the physical address. When an I/O operation is performed on storage system 100, an I/O request from a user is received by the namespace module and transmitted to the mapper. The mapper searches for a physical address (the address where data is written or the address where data is read) of data directed to by the I/O request and initiates I/O to the RAID system, so that the RAID system performs an actual I/O operation on the storage disks at the rear end.

It should be understood that FIG. 1 only schematically illustrates units, modules, or components in storage system 100 that are related to the embodiments of the present disclosure. Various components shown in FIG. 1 are merely an example storage system management architecture, and in other RAID-based storage systems, there may be other architecture division manners, other units, modules, or components for other functions, and the like. Therefore, embodiments of the present disclosure are not limited to specific devices, units, modules, or components depicted in FIG. 1, but are generally applicable to any storage system based on RAID technologies.

In storage system 100 in FIG. 1, the virtual storage unit is established on a group of physical storage units. During allocation of a virtual storage unit, if the virtual storage unit can involve more storage disks, the virtual storage unit can gain a performance advantage. That is, input/output (IO) will be balanced among more storage disks. However, involving more storage disks will expand the size of the virtual storage unit. For example, metadata storage of a mirror RAID type is taken as an example. In a current storage unit-based system, every 12 physical storage units correspond to one virtual storage unit (or "virtual uber"), and one or more virtual storage units correspond to one virtual storage space (or "virtual container"). The size of each physical storage unit is 4 GB. If at least 12 physical storage units need to be combined, the size of the virtual storage unit is at least 48 GB. This large-granularity read-write scale tends to cause a waste of a storage space.

In order to solve the above problems, the present disclosure provides a data storage method. In this method, a virtual storage region (for example, virtual storage region 130) is divided into a plurality of storage allocation units in advance, and a virtual storage unit is mapped to one or more idle storage allocation units among the plurality of storage allocation units, so that the space of the virtual storage region involved in each virtual storage unit can be reduced. Thus, storage resources can be invoked more accurately, and the storage space can be saved.

An implementation of data storage will be described above with reference to FIG. 1. The above examples are only for illustrating the present disclosure, rather than limiting the present disclosure. A flow chart of a process for data storage will be described in detail below in conjunction with FIG. 2.

Figure 2:
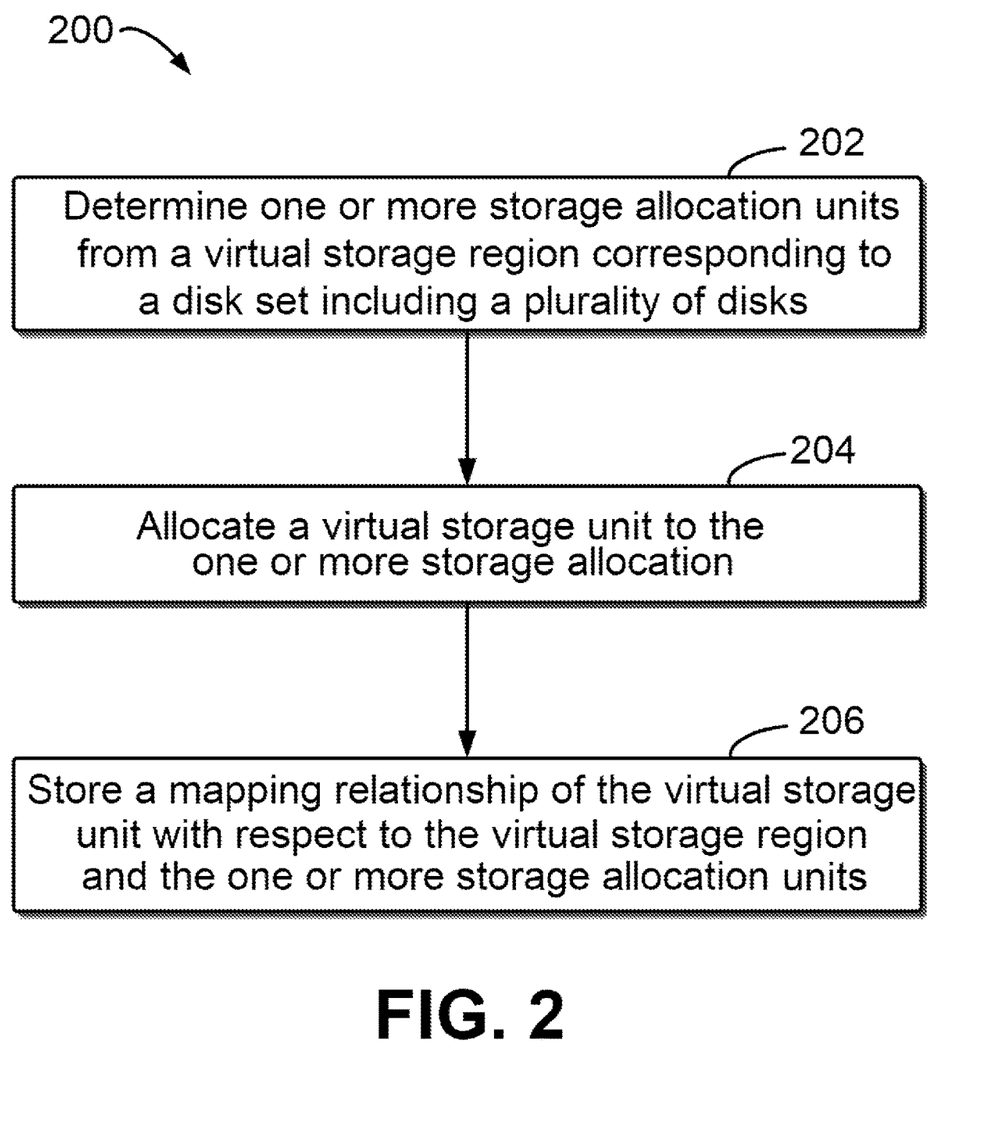
FIG. 2 shows a flow chart of a process for data storage according to an embodiment of the present disclosure.
Figure 3:
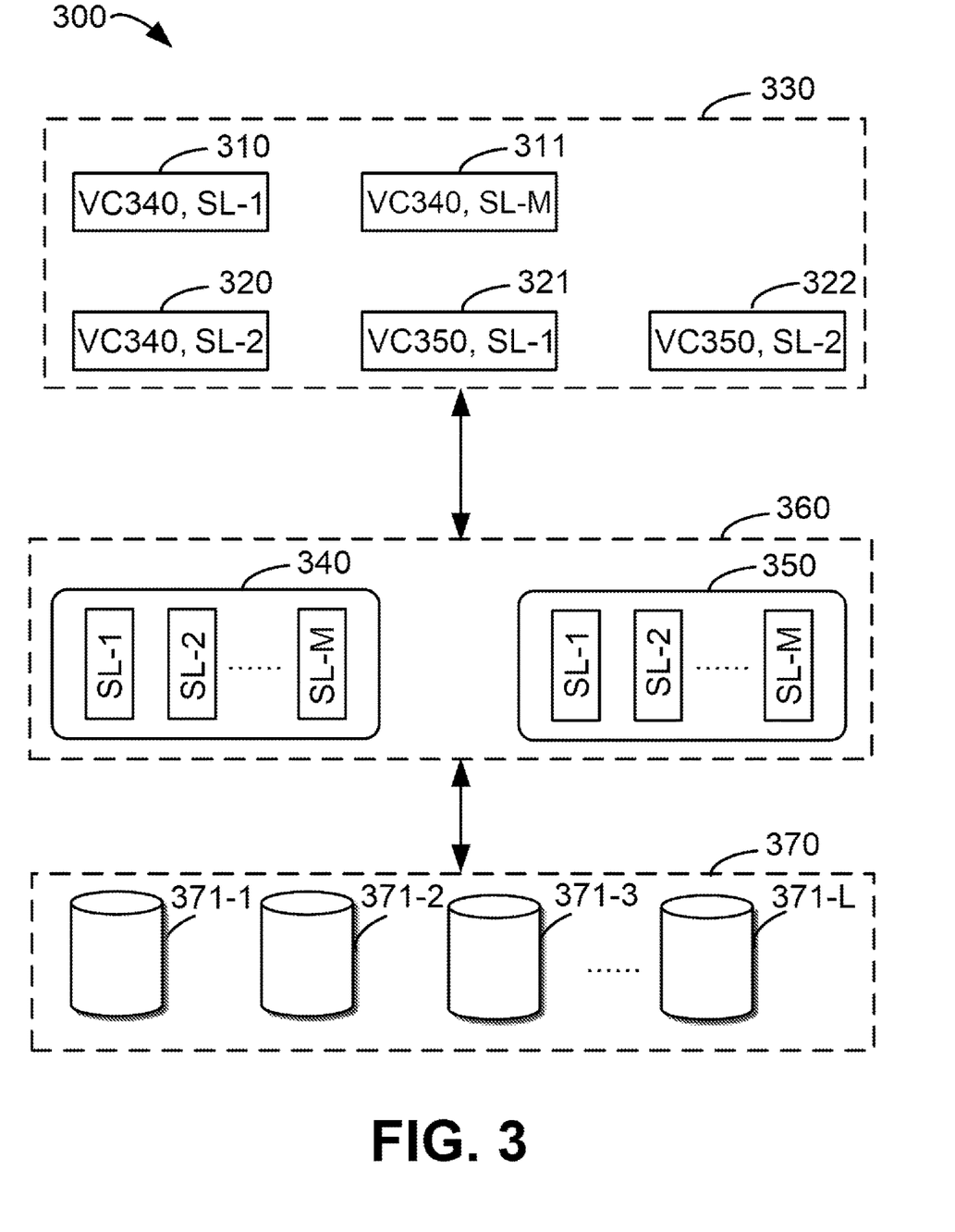
FIG. 3 shows a schematic diagram of an allocation application scenario of a virtual storage unit according to an embodiment of the present disclosure.

FIG. 2 shows a flow chart of process 200 for data storage according to an embodiment of the present disclosure. FIG. 3 shows a schematic diagram of storage system 300 in an allocation application scenario of a virtual storage unit according to an embodiment of the present disclosure. As shown in FIG. 3, storage system 300 may include virtual storage unit layer 330, virtual storage region layer 360, and hardware storage layer 370. Similar to FIG. 1, hardware storage layer 370 includes a plurality of storage disks 371-1, 371-2, 371-3, . . . , 371-L (L is an integer greater than or equal to 1), etc. for providing a physical storage space of storage system 300. For ease of discussion, these storage disks are sometimes referred to collectively or respectively as storage disk 371.

The difference between FIG. 3 and FIG. 1 is that virtual storage region 340 and virtual storage region 350 in virtual storage region layer 360 in storage system 300 are both further divided into multiple segments, that is, virtual storage region 340 is divided into storage allocation units SL-1, SL-2, . . . , SL-M (M is an integer greater than or equal to 1), and virtual storage region 350 is divided into storage allocation units SL-1, SL-2, . . . , SL-N (N is an integer greater than or equal to 1). It should be understood that virtual storage region layer 360 can also contain more virtual storage regions, and M and N may be different.

It should be understood that the sizes of virtual storage regions 340 and 350 are generally limited by factors such as the size of an actual disk slice, a RAID type, and a RAID width, but a user can divide them into a plurality of storage allocation units according to needs, and set sizes of the storage allocation units. Therefore, the multiple virtual storage units in virtual storage unit layer 330 are respectively allocated to different storage allocation units in virtual storage regions 340 and 350, which can significantly reduce the granularity of the virtual storage units. As shown in FIG. 3, virtual storage unit 310 may be allocated to storage allocation unit SL-1 in virtual storage region 340; virtual storage unit 311 may be allocated to storage allocation unit SL-M in virtual storage region 340; virtual storage unit 320 may be allocated to storage allocation unit SL-2 in virtual storage region 340; virtual storage unit 321 may be allocated to storage allocation unit SL-1 in virtual storage region 350; and virtual storage unit 322 may be allocated to the storage allocation unit SL-2 in virtual storage region 350.

It should also be understood that in some embodiments, process 200 can be performed by the RAID system described above or a computing device therein. Process 200 for data storage according to the embodiment of the present disclosure is now described with reference to FIG. 2 and FIG. 3. For case of understanding, specific data mentioned in the following description is illustrative and is not intended to limit the protection scope of the present disclosure.

At 202, the RAID system may determine one or more storage allocation units, such as storage allocation unit SL-1, from virtual storage region 340 corresponding to a disk set containing a plurality of storage disks 371. In some embodiments, in order to determine the storage allocation units from virtual storage region 340, the RAID system may traverse or poll all the storage allocation units in virtual storage regions 340 and 350 in virtual storage region layer 360. If it is found that there is an idle storage allocation unit among the storage allocation units, the idle storage allocation unit may be determined as a storage allocation unit to be allocated. It should be understood that when it is found that there is no idle storage allocation unit in the current virtual storage region, the RAID system may create an additional virtual storage region in virtual storage region layer 360 on the basis of the disk set. Furthermore, the idle storage allocation unit may be found from the storage allocation units obtained by dividing the additional virtual storage region.

At 204, the RAID system may allocate virtual storage unit 310 to determined storage allocation unit SL-1. In some embodiments, after the allocation process is completed, a state of storage allocation unit SL-1 may be set to be an allocated state. Therefore, during allocation of the storage allocation units for a next virtual storage unit, the storage allocation units with unallocated or idle states can be directly searched for, for example, storage allocation unit SL-2 in virtual storage region 340.

At 206, the RAID system may store a mapping relationship of the virtual storage unit with respect to the virtual storage region and the storage allocation units. In some embodiments, the mapping relationship may contain identity information of the virtual storage unit, position information of the virtual storage region, and position information of the storage allocation units. As an example, in FIG. 3, virtual storage unit 310 is allocated to storage allocation unit SL-1 in virtual storage region 340, so the ID of virtual storage unit 310, the position information Index (i.e., "VC340" in FIG. 3) of the virtual storage region 340, and the position information Index (i.e., "SL-1" in FIG. 3) of storage allocation unit SL-1 can be stored as a group of index data. In some embodiments, the mapping relationship may be stored in a RAID database.

In this way, each virtual storage unit does not need to correspond to the entire virtual storage region, but may correspond to one or more storage allocation units in the virtual storage region, thus significantly reducing the granularity of the virtual storage unit. In addition, since the mapping relationship contains more detailed index information, the multiple virtual storage units in virtual storage unit layer 330 does not need to have the same RAID type and RAID width. In other words, different groups of virtual storage units may share the same virtual storage region.

Figure 4:
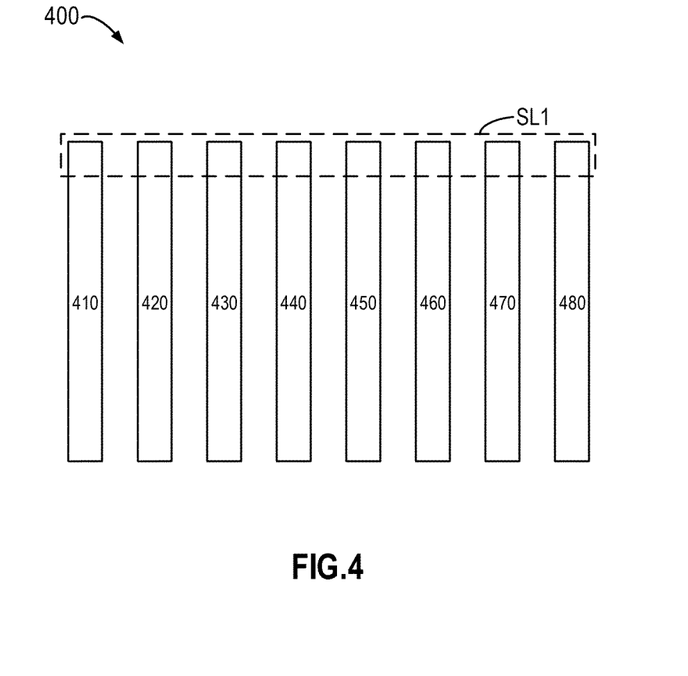
FIG. 4 shows a schematic diagram of arrangement of one storage allocation unit and a plurality of physical storage units according to an embodiment of the present disclosure.

In order to explain in more detail a correspondence relationship between each storage allocation unit and a physical storage unit in the virtual storage region, FIG. 4 shows a schematic diagram of arrangement 400 of one storage allocation unit and a plurality of physical storage units according to an embodiment of the present disclosure.

As shown in FIG. 4, after storage allocation unit SL1 is allocated to one virtual storage unit, data in storage allocation unit SL1 may be arranged on the plurality of physical storage units in its corresponding virtual storage region as evenly as possible. For example, storage allocation unit SL1 may arrange the data to physical storage units 410, 420, 430, 440, 450, 460, 470, and 480 in sequence with a small data size (for example, 2 MB or other sizes). If not all the data in storage distribution unit SL1 has been arranged after one round of arrangement, the remaining data may be arranged to physical storage units 410, 420, 430, 440, 450, 460, 470, and 480 in sequence until all the data is arranged. In this way, the storage disks corresponding to the physical storage unit may be used evenly.

Figure 5:
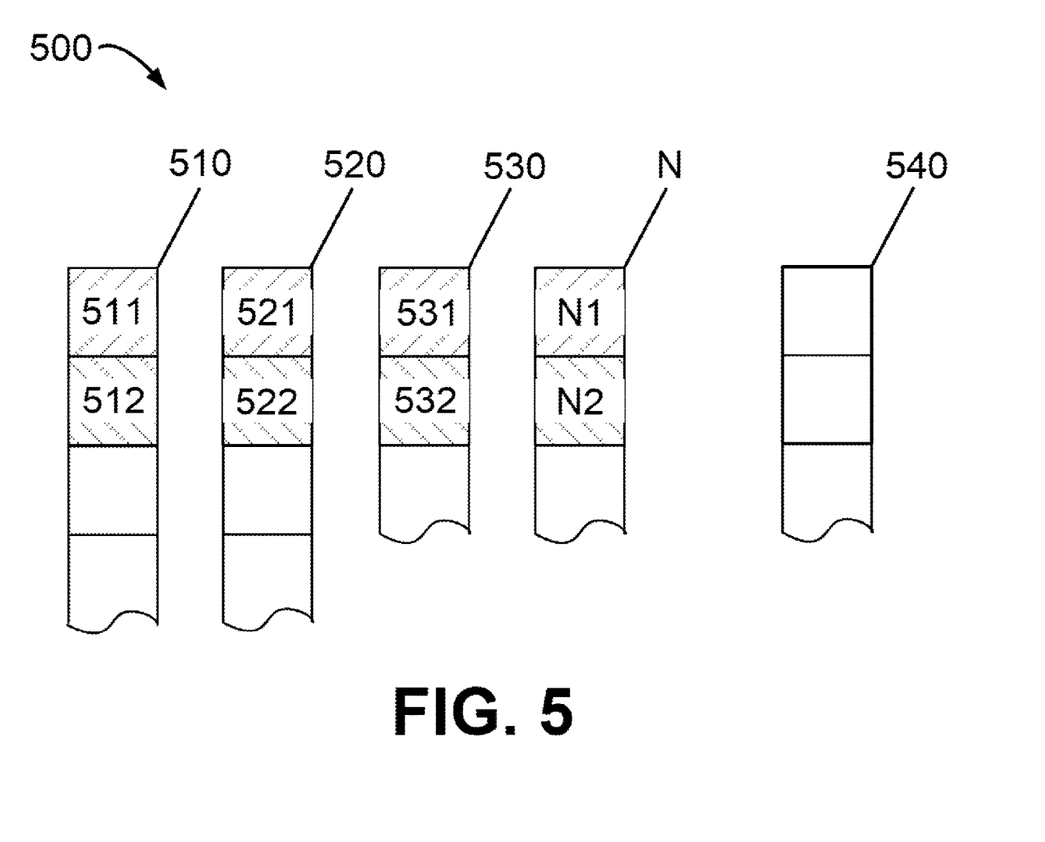
FIG. 5 shows a schematic diagram of a storage disk set of a virtual storage unit in data reconstruction and data restriping processes according to an embodiment of the present disclosure.

FIG. 5 shows a schematic diagram of storage disk set 500 of a virtual storage unit in data reconstruction and data restriping processes according to an embodiment of the present disclosure. As shown in FIG. 5, storage disk set 500 contains a plurality of storage disks 510, 520, 530, and N, and each storage disk contains a plurality of disk slices. For example, storage disk 510 contains at least disk slices 511 and 512; storage disk 520 contains at least disk slices 521 and 522; storage disk 530 contains at least disk slices 531 and 532; and storage disk N contains at least disk slices N1 and N2. When it is detected that at least one disk (for example, storage disk N) of these storage disks is unavailable, an updated disk set may be determined on the basis of remaining storage disks 510, 520, and 530. In other words, data in disk slices N1 and N2 of unavailable storage disk N may be reconstructed in other disk slices of storage disks 510, 520, and 530. The specific reconstruction process is not the main purpose of the present disclosure, so it is not repeatedly described herein.

It should be noted that since the virtual storage region is subdivided, the process of determining whether the physical storage unit in the virtual storage region has been reconstructed needs to be adjusted. As an example, when it is determined that one virtual storage unit has been reconstructed, a state of each of one or more storage allocation units corresponding to the virtual storage unit may be set to a reconstruction completed state. Since FIG. 4 shows a case where one storage allocation unit can be uniformly arranged on a plurality of physical storage units, it is necessary to further check the states of all the storage allocation units. For example, when it is determined that the states of all the storage allocation units in the virtual storage region are set to the reconstruction completed state, states of the physical storage units corresponding to the virtual storage region are set to the reconstruction completed state.

Similarly, there may be an operation of expanding storage disk set 500. In some embodiments, as shown in FIG. 5, storage disk 540 may be added to disk set 500. Therefore, when it is detected that additional storage disk 540 is added to disk set 500, an updated disk set may be determined on the basis of storage disks 510, 520, 530, N, and additional storage disk 540. Further, when it is determined that one virtual storage unit has been restriped, a state of each of one or more storage allocation units corresponding to the virtual storage unit may be set to a restriping completed state, and when it is determined that the states of all the storage allocation units in the virtual storage region are set to the restriping completed state, states of physical storage units corresponding to the virtual storage region may be set to the restriping completed state.

It should be understood that the case where the disk set is changed is not limited to an increase of the disk set caused by an increase of storage disks, but also may be, for example, a decrease of the disk set caused by a decrease of storage disks and migration of the storage disks to different disk sets caused by rearrangement of the storage disks.

By implementing the above embodiments, the granularity of each virtual storage unit can be reduced, so that storage resources can be invoked more accurately, and the storage space can be saved. In addition, a plurality of virtual storage units with different RAID types and RAID widths can share the same virtual storage region, making the use of the virtual storage region more efficient. In addition, since the virtual storage unit can arrange data across a plurality of physical storage units at a smaller granularity, the performance bottleneck caused by a small number of storage disks being emphatically used can be avoided.

Figure 6:
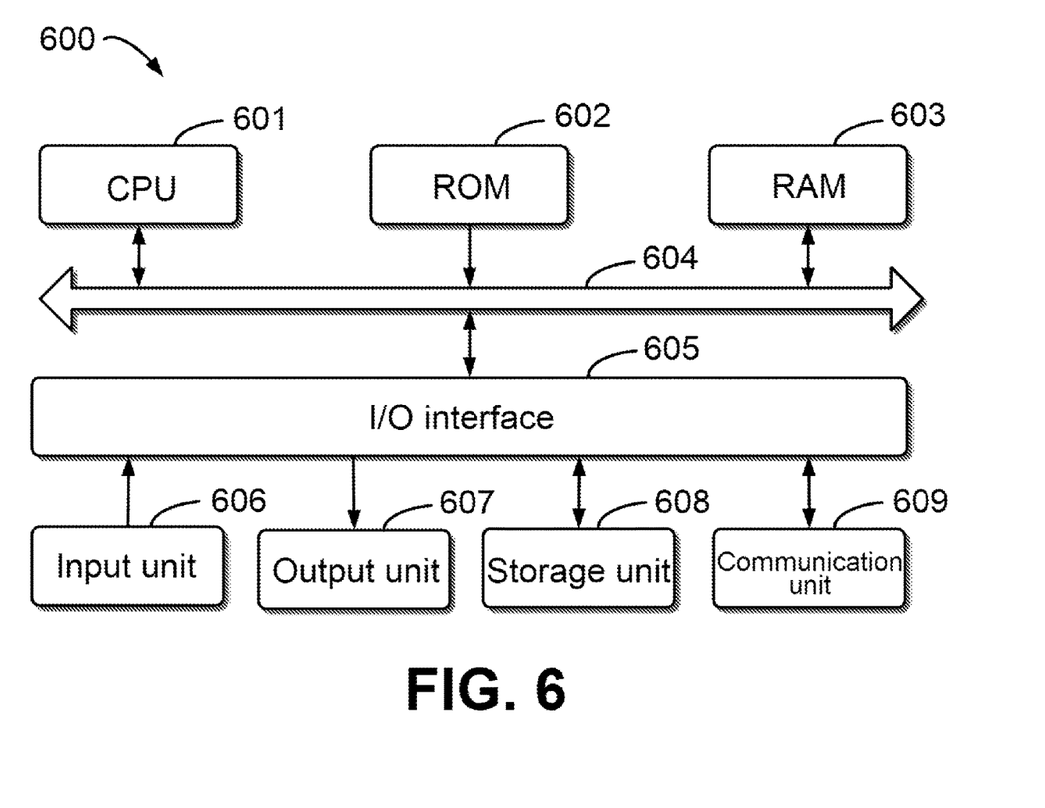
FIG. 6 illustrates a schematic block diagram of an example device suitable for use to implement embodiments of the present disclosure.

FIG. 6 illustrates a schematic block diagram of example device 600 suitable for use to implement embodiments of the present disclosure. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as process 200, may be executed by processing unit 601. For example, in some embodiments, process 200 may be implemented as a computer software program that is tangibly included in a machine-readable medium, for example, storage unit 608. In some embodiments, part of or all the computer program may be loaded and/or installed onto device 600 via ROM 602 and/or communication unit 609. When the computer program is loaded into RAM 603 and executed by CPU 601, one or more actions of process 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A data storage method, comprising:
    determining one or more storage allocation units from a virtual storage region corresponding to a disk set including a plurality of disks;
    allocating a virtual storage unit to the one or more storage allocation units; and
    storing a mapping relationship of the virtual storage unit with respect to the virtual storage region and the one or more storage allocation units;
wherein determining the one or more storage allocation units comprises:
    traversing storage allocation units in the virtual storage region;
    when idle storage allocation units are among the storage allocation units, determining the idle storage allocation units as the one or more storage allocation units; and
    when idle storage allocation units are not among the storage allocation units, establishing an additional virtual storage region on the basis of the disk set.

2. The method according to claim 1, further comprising:
in response to that at least one disk among the plurality of disks is unavailable, determining an updated disk set on the basis of the remaining disks among the plurality of disks.

3. The method according to claim 2, wherein determining the updated disk set at least comprises:
in response to that the virtual storage unit has been reconstructed, setting a state of each of the one or more storage allocation units to a reconstruction completed state; and
in response to that the states of all the storage allocation units in the virtual storage region are set to the reconstruction completed state, setting states of physical storage units corresponding to the virtual storage region to a reconstruction completed state.

4. The method according to claim 1, further comprising:
in response to that an additional disk is added in the disk set, determining an updated disk set on the basis of the plurality of disks and the additional disk.

5. The method according to claim 4, wherein determining the updated disk set at least comprises:
in response to that the virtual storage unit has been restriped, setting a state of each of the one or more storage allocation units to a restriping completed state; and
in response to that the states of all the storage allocation units in the virtual storage region are set to the restriping completed state, setting states of physical storage units corresponding to the virtual storage region to a restriping completed state.

6. The method according to claim 1, wherein allocating the virtual storage unit to the one or more storage allocation units comprises:
setting a state of each of the one or more storage allocation units to an allocated state.

7. The method according to claim 1, wherein the mapping relationship contains identity information of the virtual storage unit, position information of the virtual storage region, and position information of the one or more storage allocation units.

8. The method according to claim 7, wherein storing the mapping relationship comprises:
storing the mapping relationship to a Redundant Array of Independent Disks (RAID) database.

9. The method according to claim 1, further comprising:
forming the virtual storage unit from a plurality of physical storage units.

10. The method according to claim 9, wherein forming the virtual storage unit from the plurality of physical storage units includes:
providing, as the virtual storage unit, a virtual uber from at least 48 GB of storage from a plurality of physical storage disks.

11. An electronic device, comprising:
a processor; and
a memory coupled to the processor and having instructions stored therein, wherein the instructions, when executed by the processor, cause the electronic device to perform actions comprising:
determining one or more storage allocation units from a virtual storage region corresponding to a disk set including a plurality of disks;
allocating a virtual storage unit to the one or more storage allocation units; and
storing a mapping relationship of the virtual storage unit with respect to the virtual storage region and the one or more storage allocation units;
wherein determining the one or more storage allocation units comprises:
traversing storage allocation units in the virtual storage region;
when idle storage allocation units are among the storage allocation units, determining the idle storage allocation units as the one or more storage allocation units; and
when idle storage allocation units are not among the storage allocation units, establishing an additional virtual storage region on the basis of the disk set.

12. The device according to claim 11, wherein the actions further comprise:
in response to that at least one disk among the plurality of disks is unavailable, determining an updated disk set on the basis of the remaining disks among the plurality of disks.

13. The device according to claim 12, wherein determining the updated disk set at least comprises:
in response to that the virtual storage unit has been reconstructed, setting a state of each of the one or more storage allocation units to a reconstruction completed state; and
in response to that the states of all the storage allocation units in the virtual storage region are set to the reconstruction completed state, setting states of physical storage units corresponding to the virtual storage region to a reconstruction completed state.

14. The device according to claim 11, wherein the actions further comprise:
in response to that an additional disk is added in the disk set, determining an updated disk set on the basis of the plurality of disks and the additional disk.

15. The device according to claim 14, wherein determining the updated disk set at least comprises:
in response to that the virtual storage unit has been restriped, setting a state of each of the one or more storage allocation units to a restriping completed state; and
in response to that the states of all the storage allocation units in the virtual storage region are set to the restriping completed state, setting states of physical storage units corresponding to the virtual storage region to a restriping completed state.

16. The device according to claim 11, wherein allocating the virtual storage unit to the one or more storage allocation units comprises:
setting a state of each of the one or more storage allocation units to an allocated state.

17. The device according to claim 11, wherein the mapping relationship contains identity information of the virtual storage unit, position information of the virtual storage region, and position information of the one or more storage allocation units.

18. The device according to claim 11, wherein the actions further comprise:
forming the virtual storage unit from a plurality of physical storage units.

19. The device according to claim 18, wherein forming the virtual storage unit from the plurality of physical storage units includes:
providing, as the virtual storage unit, a virtual uber from at least 48 GB of storage from a plurality of physical storage disks.

20. A computer program product having a non-transitory computer readable medium which stores a set of instructions to perform data storage; the set of instructions, when carried out by computerized circuitry, causing the computerized circuitry to perform a method of:
    determining one or more storage allocation units from a virtual storage region corresponding to a disk set including a plurality of disks;
    allocating a virtual storage unit to the one or more storage allocation units; and
    storing a mapping relationship of the virtual storage unit with respect to the virtual storage region and the one or more storage allocation units;
wherein determining the one or more storage allocation units comprises:
    traversing storage allocation units in the virtual storage region;
    when idle storage allocation units are among the storage allocation units, determining the idle storage allocation units as the one or more storage allocation units; and
    when idle storage allocation units are not among the storage allocation units, establishing an additional virtual storage region on the basis of the disk set.

* * * * *